United States Patent [19]

Fujie et al.

[11] Patent Number: 5,223,976
[45] Date of Patent: Jun. 29, 1993

[54] VEHICLE MIRROR INCLUDING AN ANTI-HALATION MIRROR MEMBER A PIEZO-ELECTRIC VIBRATOR AND A SPACER MEMBER

[75] Inventors: Naofumi Fujie, Nagoya; Koji Ito, Kariya; Tomoaki Imaizumi, Aichi; Kouetsu Hibino, Toyota; Hideaki Ueno, Okazaki; Yasuhiro Otsuka, Toyota, all of Japan

[73] Assignee: Aisin Seiki Kabushiki Kaisha, Kariya, Japan

[21] Appl. No.: 549,746

[22] Filed: Jul. 9, 1990

[30] Foreign Application Priority Data

Jul. 11, 1989 [JP] Japan ................... 1-178525

[51] Int. Cl.⁵ .................. G02B 5/08; G02B 5/24; G02B 7/182; B60R 1/06
[52] U.S. Cl. .................. 359/507; 359/604; 15/250.003
[58] Field of Search ............. 359/507, 512, 602, 603, 359/604; 15/250.001, 250.003, 250.05

[56] References Cited

U.S. PATENT DOCUMENTS

| | | | |
|---|---|---|---|
| 5,007,722 | 4/1991 | Mori et al. | 350/382 |
| 5,025,187 | 6/1991 | Fujie et al. | 359/507 |
| 5,148,312 | 9/1992 | Kawai et al. | 359/507 |
| 5,155,625 | 10/1992 | Komatsu et al. | 359/512 |

FOREIGN PATENT DOCUMENTS

| | | |
|---|---|---|
| 3913970A1 | 11/1989 | Fed. Rep. of Germany . |
| P4021926.7-22 | 11/1991 | Fed. Rep. of Germany . |
| 182023 | 8/1986 | Japan ................ 359/603 |
| 2156295 | 10/1985 | United Kingdom ........ 359/603 |

Primary Examiner—Jon W. Henry
Attorney, Agent, or Firm—Burns, Doane, Swecker & Mathis

[57] ABSTRACT

The vehicle mirror of the present invention is made such that a supporting member is arranged with a predetermined spacing in respect to the rear mirror member of an anti-halation mirror member having the anti-halation device such as liquid crystal or electrochromic element or the like between the front transparent member and the rear mirror member getting a reflection as the mirror, the piezo-electric vibrator generating vibration is fixed to the supporting member, a spacing between the rear mirror member and the supporting member is held by the spacer member and then the vibration of the piezo-electric vibrator is tansmitted to the front transparent member. The front transparent member is exposed from the opening of the holder and at the same time the circumferential edge of the anti-halation mirror member is held by the holding part. With such an arrangement above, a function of anti-halation and another function of removing water droplets can be provided.

7 Claims, 12 Drawing Sheets

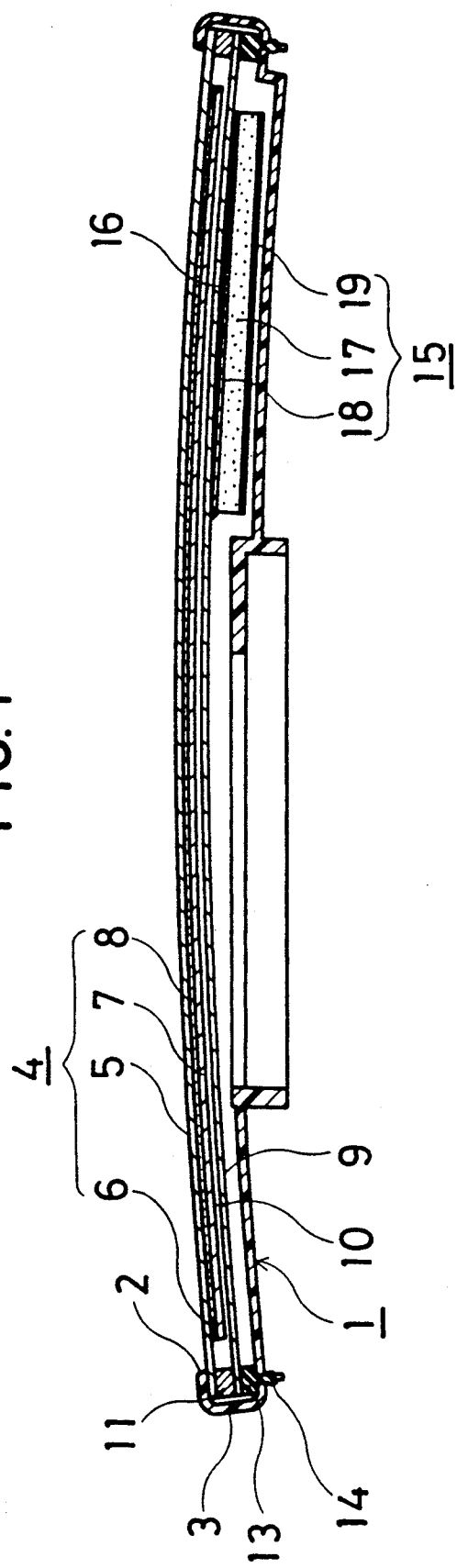
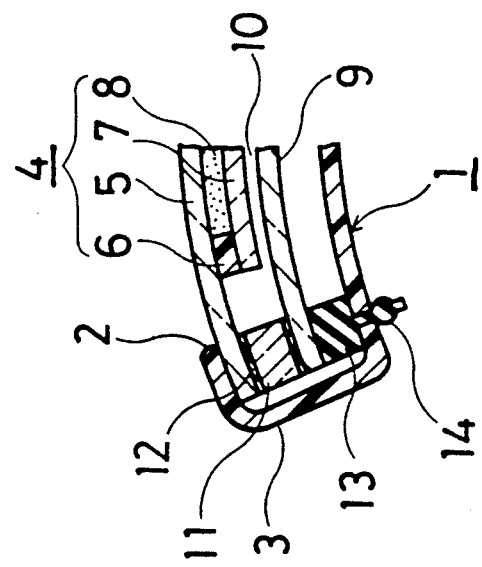
FIG.1
FIG.2

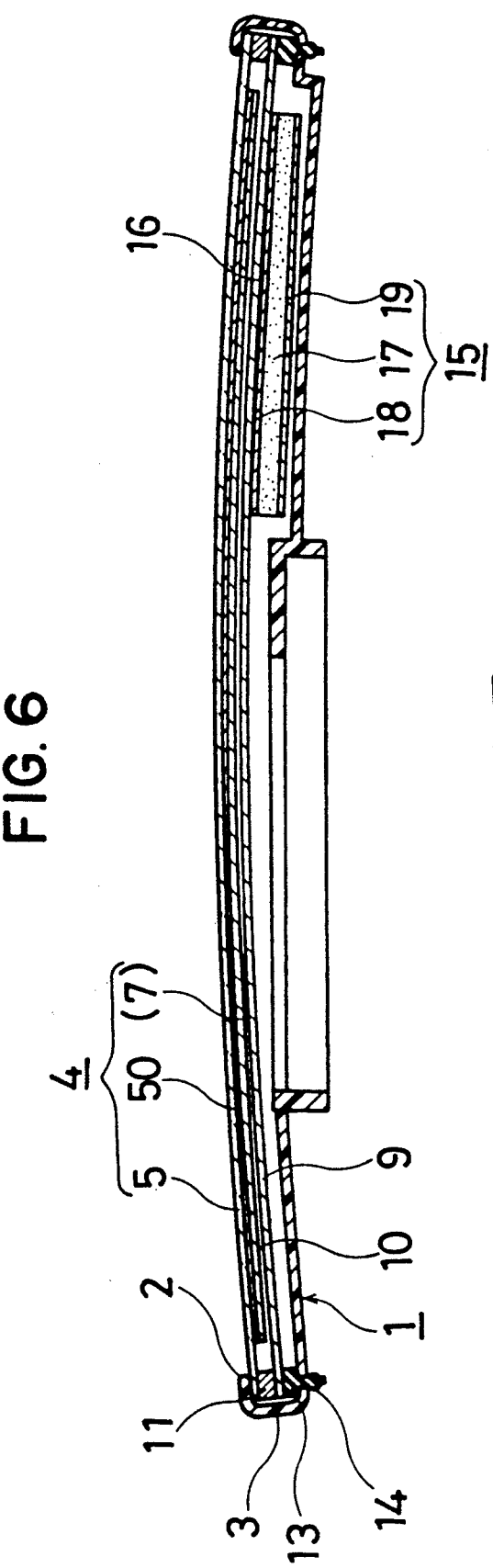
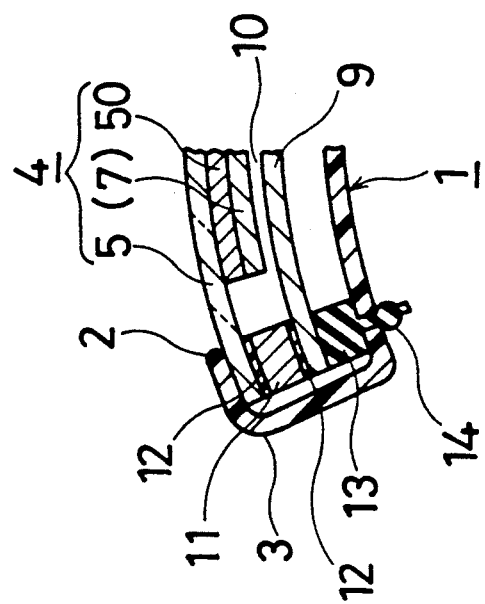

VEHICLE MIRROR INCLUDING AN ANTI-HALATION MIRROR MEMBER A PIEZO-ELECTRIC VIBRATOR AND A SPACER MEMBER

BACKGROUND OF THE INVENTION

1. Field of the Invention

This invention relates to a vehicle mirror which is suitable for a vehicle side mirror and the like, more particularly a vehicle mirror having a function of anti-halation and a function to remove water droplets with a piezo-electric vibrator and the like.

2. Description of the Related Art

As the conventional type of the vehicle mirror, a technology shown in FIGS. 15 and 16 can be applied.

FIG. 15 is a partial sectional view for showing a vehicle mirror having a conventional function to prevent halation. FIG. 16 is a sectional view for showing a vehicle mirror having a function to remove water droplets which was disclosed in Jap. U.M. Laid-Open No. Sho 61-30552.

In the vehicle mirror shown in FIG. 15, a holder 31 is formed with a releasing part 32 and a holding part 33. Anti-halation mirror member 34 having a convex surface with a predetermined curvature is stored within the holder 31. The anti-halation mirror member 34 is comprised of a front transparent glass member 35 exposed from the releasing part of the holder 31, a rear mirror member 37 having a reflection film (not shown) fixed to a rear side of the front transparent member 35 by adhesive agent 36 in a desired spaced-apart relation thereto and a liquid crystal 38 sealingly enclosed between the rear mirror member 37 and the front transparent member 35. A circumference of the front transparent member 35 is held by the holding part 33 of the holder 31 through a spacer 39.

In the conventional type of vehicle mirror constructed as above, when the liquid crystal 38 of the anti-halation mirror member 34 is electrically energized, a transmission factor of the light beam in the liquid crystal 38 is increased or decreased to cause a reflection factor of the rear mirror member 37 to be varied. Accordingly, an appropriate adjustment of an applied voltage for the liquid crystal 38 enables reflected light from the anti-halation mirror member 34 caused by head lamps of a subsequent vehicle to be dampened and to prevent a driver from being dazzled.

In turn, in the case of the vehicle mirror shown in FIG. 16, a holder 41 is supported at a vehicle body (not shown) through a stay 42, and a glass mirror member 43 having a reflection film (not shown) is installed within the holder 41. A piezo-electric vibrator 44 for generating vibration under an effect of piezo-electricity is installed between the holder 41 and the stay 42. A driving circuit 46 and an operating switch 47 in a vehicle compartment are connected in series between the piezo-electric vibrator 44 and a power supply 45.

In the conventional type of the vehicle mirror constructed as described above, if water droplets are adhered to the surface of the mirror member 43, the operating switch 47 in the vehicle compartment is operated to generate a vibration of the piezo-electric vibrator 44 and then the vibration is transmitted to the mirror member 43 through the housing member 41. Thus, it is possible to remove the water droplets adhered to the surface with the vibration of the mirror member 43 and to clarify an image in the mirror member 43.

In this case, the conventional type of vehicle mirror shown in FIG. 15 possesses an anti-halation function, but function to remove the water droplets. In addition, the prior art vehicle mirror shown in FIG. 16 possesses an ability to remove water droplets, but cannot function to prevent halation.

As a practical means for integrally combining both functions to get a vehicle mirror having both functions, it has been proposed to provide a configuration in which the piezo-electric vibrator 44 is directly adhered to the rear mirror member 37 of the anti-halation mirror member 34 as shown in a partial sectional view illustrating an example of the vehicle mirror having an anti-halation function shown in FIG. 17. However, if the aforesaid piezo-electric vibrator 44 is directly adhered to the rear mirror member 37, a vibration of the rear mirror member 37 is accommodated by the liquid crystal 38 when the rear mirror member 37 is vibrated ultrasonically, and then an ultra-sonic vibration is not efficiently transmitted from the rear mirror member 37 of the aforesaid anti-halation mirror member 34 to the rear transparent member 35. In case that clearances between the front transparent member 35 and the rear mirror member 37 are different at each of the portions due to a difference of a linear expansion coefficient under a temperature condition at the time of adhesion and there is a large clearance around the adhered portion, the liquid crystal 38 is discolored and becomes dark. In turn, if there is a small clearance around the adhered portion, the liquid crystal 38 shows a phenomenon of discoloring to a white color.

In view of the foregoing, it is the first subject matter of the present invention to provide a vehicle mirror capable of improving the efficiency of removal of water droplets by the piezo-electric vibrator. It is the second subject matter of the present invention to provide a vehicle mirror capable of realizing the anti-halation function, improving an efficiency of removing water droplets with a piezo-electric vibrator and having both anti-halation function and water droplets removing function.

SUMMARY OF THE INVENTION

The vehicle mirror of the present invention is constructed such that anti-halation means such as a liquid crystal or electrochromic member is arranged between the front transparent member and the rear mirror member capable of getting a reflection as a mirror to provide a anti-halation mirror member, a supporting member having the piezo-electric vibrator generating a vibration is arranged with a desired spacing in respect to the rear mirror member of the anti-halation mirror member, and then the vibration of the aforesaid piezo-electric vibrator is transmitted to the aforesaid front transparent member through the spacer member for holding the aforesaid spacing between the aforesaid rear mirror member and the aforesaid supporting member. The aforesaid front transparent member is exposed from the opening of the holder, the circumference of the aforesaid anti-halation mirror member is held by the spacer, thereby a function of anti-halation can be realized and further an efficiency of removing the water droplets by the piezo-electric element can be improved.

BRIEF DESCRIPTION OF THE DRAWINGS

FIG. 1 is a longitudinal section for showing a vehecle mirror of one preferred embodiment of the present invention.

FIG. 2 is a partial enlarged section of FIG. 1.

FIG. 6 is a longitudinal section for showing a vehicle mirror of the fourth preferred embodiment of the present invention.

FIG. 7 is a partial enlarged section of FIG. 6.

DESCRIPTION OF THE PREFERRED EMBODIMENTS

Figure 3A:
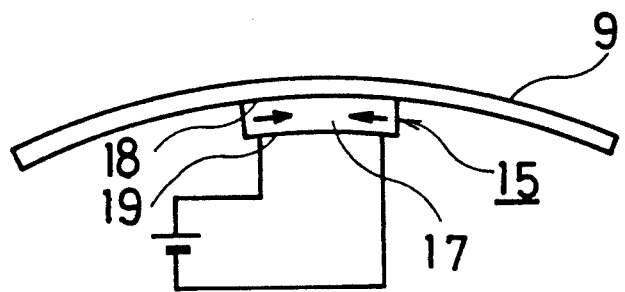
FIG. 3(a)-3(c) a scehmatic views for illustrating an operation of a piezo-electric vibrator in the vehicle mirror of FIG. 1.

Some preferred embodiments of the present invention will be described later.

First Preferred Embodiment

At first, one preferred embodiment of the vehicle mirror of the present invention will be described in reference to the drawings.

FIG. 1 is a longitudinal section for showing the vehicle mirror of the first preferred embodiment of the present invention. FIG. 2 is a partial enlarged section of FIG. 1.

As shown in FIGS. 1 and 2, a holder 1 for the vehicle mirror of the first preferred embodiment is formed by synthetic resin into a dish-like shape. The holder 1 is formed with an opening 2 to which a light beam is incident or from which the light beam reflects, and a holding part 3 of a substantial C-shaped section for enclosing the opening 2. Within the holder 1 is stored the anti-halation mirror member 4 having a convex surface of a predetermined curvature.

The aforesaid anti-halation mirror member 4 is comprised of a front transparent member 5 made of glass plate or transparent synthetic resin plate or the like exposed from the opening 2 of the holder 1; a rear mirror member 7 made of glass plate or transparent synthetic resin plate or metallic plate having a smaller area than that of the front transparent member 5; and a liquid crystal 8 acting as anti-halation means placed between the rear mirror member 7 and the front transparent member 5 so as to constitute the aforesaid rear mirror member 7 as an electrode. As a voltage is applied to the front transparent member 5 and the liquid crystal 8, a transmittance factor of light beam in the liquid crystal 8 is increased or decreased so as to enable a reflection factor of the rear mirror member 7 to be varied.

At the rear side of the rear mirror member 7 of the aforesaid anti-halation mirror member 4 is arranged the supporting member 9 composed of glass or metallic plate substantially the same as the front transparent member 5 in parallel with it with a predetermined spacing 10 being left between the supporting member and the rear mirror member 7. Between the circumferential edge of the supporting member 9 and the circumferential edge of the front transparent member 5 is installed a spacer member 11 made of a ring-like engineering plastic material such as glass, metal having a small loss of vibration energy such as titanium, or glass cloth epoxy or the like for holding the aforesaid spacing 10 between the rear mirror member 7 and the supporting member 9. The spacer member 11 may be composed of only a thick adhesive agent layer.

A ring-like rubber bushing 13 is connected to the circumferential edge of the aforesaid supporting member 9 opposite to the spacer member 11, and a projecting piece 14 of the rubber bushing 13 is engaged with and held at the holding part 3 of the holder 1. Accordingly, in the first preferred embodiment, the circumferential edge of the front transparent member 5 of the anti-halation mirror member 4 and the circumferential edge of the supporting member 9 are held by the holding part 3 of the holder 1.

The piezo-electric vibrator 15 is fixed to the rear surface of the aforesaid supporting member 9 by a proper fixing means such as an adhesive agent 16 or the like in such a way as it may not be contacted with the rear mirror member 7. This piezo-electric vibrator 15 is constructed such that the electrodes 18 and 19 of a flexible printed circuit board are adhered inductively to both front and rear surfaces of the flat-plate like piezo-electric element 17 of piezo-electric ceramics and arranged in parallel with the front transparent member 5 and the rear mirror member 7. When a voltage of a power supply is applied between the electrodes 18 and 19 through an oscillation circuit, an ultra-sonic vibration is generated due to an effect of piezo-electricity of the piezo-electric element 17. The vibration generated in the piezo-electric vibrator 15 expands over an entire supporting member 9 and is transmitted to the front transparent member 5 through the spacer member 11 from its circumferential edge.

Operation of the vehicle mirror of the first preferred embodiment constructed as above will be described.

When the liquid crystal 8 of the anti-halation mirror member 4 is electrically energized, a transmittance factor of the light beam in the liquid crystal 8 is increased or decreased, and a reflection factor of the rear mirror member 7 is varied. Accordingly, if the applied voltage of the liquid crystal 8 is properly adjusted, the reflection light from the anti-halation mirror member 4 caused by the head lamps of the subsequent vehicle can be dampened and a dazzelment of the driver can be prevented.

In turn, as shown in FIG. 3(a), if the (+) terminal of the power supply is connected to the electrode 18 of the piezo-electric vibrator 15 and the (−) terminal of the power supply is connected to the electrode 19, the piezo-electric element 17 is retracted in its longitudinal direction under a lateral effect of the piezo-electric effect. At this time, a strong retracting force may act against the rear surface of the supporting member 9 and then the supporting member 9 is bent downwardly as viewed in the figure.

Figure 3B:
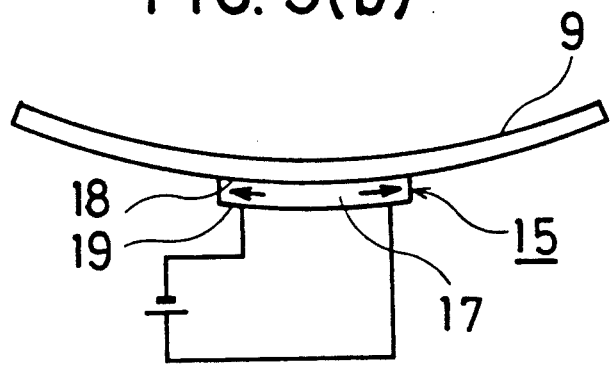

As shown in FIG. 3(b), if the (−) terminal of the power supply is connected to the electrode 18 and the (+) terminal of the power supply is connected to the electrode 19 in a manner opposite to the case of FIG. 3(a), the piezo-electric element 17 extends in a longitudinal direction under the lateral effect. At this time, a strong extending force may act against the rear surface of the supporting member 9 to cause the supporting member 9 to be bent upwardly as viewed in the figure.

Figure 3C:
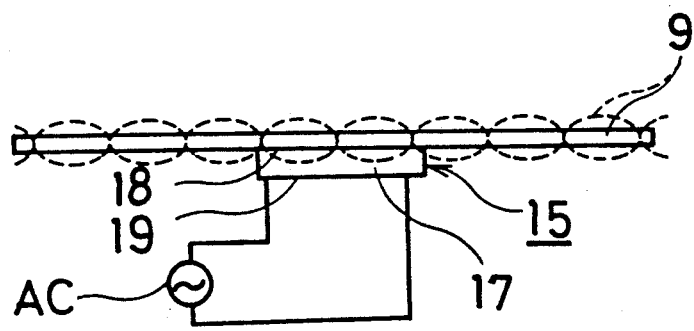

As shown in FIG. 3(c), when an oscillation circuit AC is connected to the piezo-electric vibrator 15 and an AC voltage is applied to the piezo-electric element 17, a vibration extending or retracting in a radial direction from the center of the piezo-electric element 17 is generated, the supporting member 9 is bent repeatedly in an opposite directions and a vibration is generated in the supporting member 9. In this case, as shown in FIG. 1, the circumferential edge of the supporting member 9 is fixed to the circumferential edge of the front transparent member 5 through the spacer member 11, so that the vibration generated in the supporting member 9 is transmitted from the circumferential edge of the front transparent member 5 to its entire body through the spacer member 11.

Accordingly, if a frequency of the AC voltage to be applied to the piezo-electric vibrator 15 is selected to have a proper value, the front transparent member 5 may generate a resonance, a uniform standing wave having a large amplitude is generated over its entire body and then the front transparent member 5 may move at a high speed with its standing wave. At this time, the adhered substances such as water droplets, frost or dust or the like adhered to the surface of the front transparent member 5 are applied with a high kinetic energy, are dripped by their own weight or atomized and are removed from the front transparent member 5.

As described above, the vehicle mirror of the first preferred embodiment is comprised of the anti-halation mirror member 4 having the liquid crystal 8 enclosed between the front transparent member 5 and the rear mirror member 7 having a little smaller area than that of the front transpatent member 5; the supporting member 9 is arranged at the rear mirror member 7 of the anti-halation mirror member 4 with a predetermined determined space 10 being provided; the piezo-electric vibrator 15 is fixed to the supporting member 9 while not being contacted with the rear mirror member 7; the spacer member 11 is positioned between the circumferential edge of the front transparent member 5 and the circumferential edge of the supporting member 9 so as to transmit a vibration of the piezo-electric vibrator 15 to the front transparent member 5; and the holder 1 having the holding part 3 for holding the circumferential edge of the front transparent member 5 and the circumferential edge of the supporting member 9.

Accordingly, in accordance with the vehicle mirror of the first preferred embodiment, the piezo-electric vibrator 15 is fixed to the supporting member 11, so that the vibration of the piezo-electric vibrator 15 may not be absorbed by the holder 1. In addition, the spacing 10 between the rear mirror member 7 and the supporting member 9 is held by the spacer member 11 and the vibration of the piezo-electric vibrator 15 is transmitted to the front transparent member 5 through the spacer member 11, resulting in that the vibrating energy is not uselessly consumed within the liquid crystal 8, but a vibration sufficient to remove the water droplets is energized in the front transparent member 5. Since the piezo-electric vibrator 15 is fixed to the supporting member 9 while not being contacted with the rear mirror member 7, a clearance between the front transparent member 5 and the rear mirror member 7 is not varied in response to a temperature at a condition where the piezo-electric vibrator 15 is fixed and consequently a discoloration of the liquid crystal 18 as found in the prior art can be positively prevented. Accordingly, the anti-halation function provided by the liquid crystal 8 may not be troubled, but an efficiency of removing water droplets with the piezo-electric vibrator 15 can be improved.

According to this first preferred embodiment, in particular, the spacer member 11 is placed between the circumferential edge of the front transparent member 5 and the circumferential edge of the supporting member 9, and the vibration of the supporting member 9 is transmitted only through the spacer member 11 to the front transparent member 5 while its large amplitude being is maintained, so that an attenuation of the vibrating energy in the midway of the transmittance of the energy can be restricted and the vibration of the piezo-electric vibrator 15 can be efficiently transmitted to the front transparent member 5.

Second Preferred Embodiment

The second preferred embodiment of the present invention applied to the vehicle mirror will be described.

Figure 4:
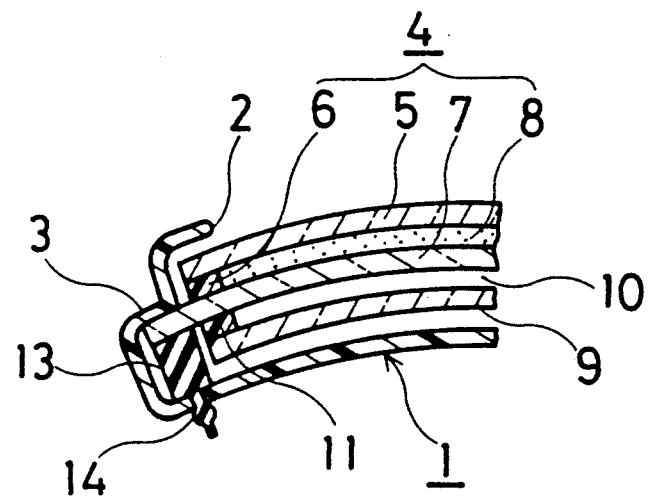
FIG. 4 is a partial section for showing a vehicle mirror of the second preferred embodiment of the present invention.

FIG. 4 is a partial enlarged section for showing a vehicle mirror of the second preferred embodiment. In this figure, the same reference numerals as those of the first preferred embodiment denote the same or corresponding portions in the first preferred embodiment.

In the vehicle mirror of the second preferred embodiment, the anti-halation mirror member 4 has enclosed the liquid crystal 8 acting as the anti-halation means between the front transparent member 5 and the rear mirror member 7 having a slightly larger area than that of the front transparent member 5. The supporting member 9 is formed in the substantial same shape as that of the front transparent member 5 and arranged at the rear mirror member 7 with a predetermined spacing 10 being left therebetween. To the rear side of this supporting member 9 is fixed the piezo-electric vibrator 15 (not shown in FIG. 4) while not being contacted with the rear mirror member 7. The spacer member 11 is placed between a rear surface of the rear mirror member 7 and the circumferential edge of the supporting member 9 at the position corresponding to the circumferential edge of the front transparent member 5 so as to maintain the spacing 10 between the rear mirror member 7 and the supporting member 9 and at the same time the vibration of the piezo-electric vibrator 15 is transmitted from the circumferential edge of the supporting member 9 to the front transparent member 5. Then, the holder 1 is provided with an opening 2 for exposing the front transparent member 5 and the holding part 3 for holding the circumferential edge of the rear mirror member 7 through a rubber bushing 13.

Accordingly, according to the vehicle mirror of the second preferred embodiment of the present invention, only the circumferential edge of the rear mirror member 7 is held at the holding part 3 of the holder 1, so that the vibrating energy caused by the piezo-electric vibrator 15 is hardly transmitted to the holder 1 in addition to the same actions and effects as those of the first preferred embodiment. However, since the adhesive agent 6 for adhering the front transparent member 5 to the rear transparent member 7 is placed at the same position as that of the spacer member 11 and further at the outermost circumferential edge of the front transparent member 5, so that this is different from that of the first preferred embodiment and its adhesive agent 6 may not provide a bad influence against a visibility of the anti-halation mirror member 4. At the same time there is no disadvantage that the vibration generated in the front transparent member 5 is divided by the adhesive agent 6, transmitted to the rear mirror member 7 and attenuated. Accordingly, the vibration of the piezo-electric vibrator 15 can be efficiently transmitted to the front transparent member 5 and thus a high water droplet removing effect can be attained.

Third Preferred Embodiment

The third preferred embodiment of the vehicle mirror of the present invention will be described.

Figure 5:
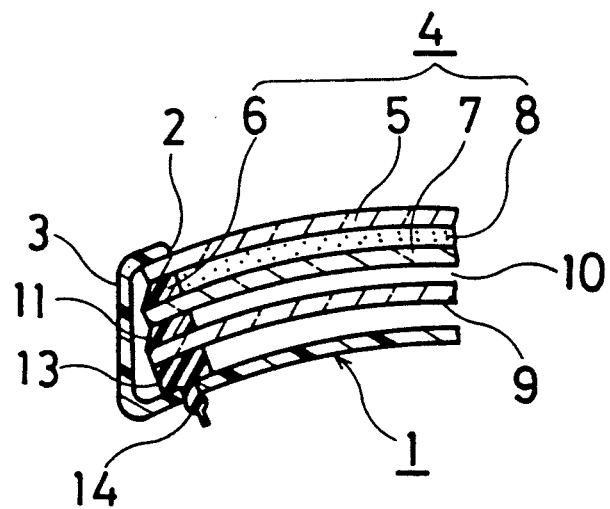
FIG. 5 is a partial section for showing a vehicle mirror of the third preferred embodiment of the present invention.

FIG. 5 is a partial enlarged section for showing the vehicle mirror of the third preferred embodiment of the present invention. In the figure, the same reference numerals as those of each of the aforesaid preferred embodiments denote the same or corresponding portions of those of each of the aforesaid preferred embodiments. Only the portions which are different from those of each of the aforesaid preferred embodiments will be described.

In the vehicle mirror of the third preferred embodiment, each of the front transparent member 5, the rear mirror member 7 and the supporting member 9 is formed in the substantial same shape. The spacer member 11 is placed between the circumferential edge of the rear mirror member 7 and the circumferential edge of the supporting member 9. The holding part 3 of the holder 1 holds the circumferential edge of the front transparent member 5, the circumferential edge of the rear mirror member 7 and the circumferential edge of the supporting member 9 at the same positions, respectively.

Accordingly, according to the vehicle mirror of the third preferred embodiment, in addition to the same actions and effects as those of the aforesaid first preferred embodiment, the front transparent member 5, the rear mirror member 7 and the supporting member 9 are fixed to each other at the substantial same circumferential edge positions and their fixed portions are held at the holding part 3 of the holder 1, so that there is no possibility of applying a bad influence against a visibility of the anti-halation mirror member 4. Further the front transparent member 5 and the supporting member 9 are connected to each other at the portion acting for generating a vibration, resulting in that the vibration of the piezo-electric vibrator 15 can be efficiently transmitted to the front transparent member 5 and further a high water droplets removing effect can be attained.

Fourth Preferred Embodiment

The fourth preferred embodiment of the present invention in which it is applied to the vehicle mirror will be described.

Figure 8:
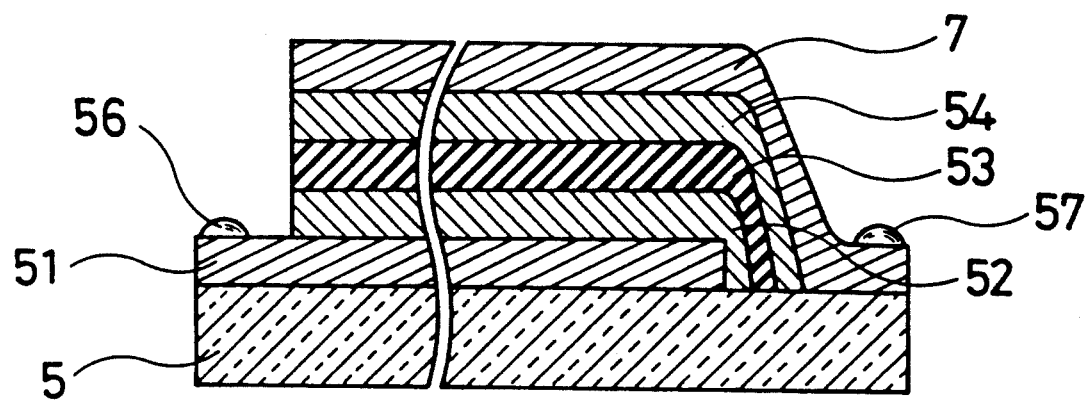
FIG. 8 is a section for showing a substantial part of a configuration of an anti-halation mirror member applied in a vehicle mirror of the fourth preferred embodiment of the present invention.
Figure 9:
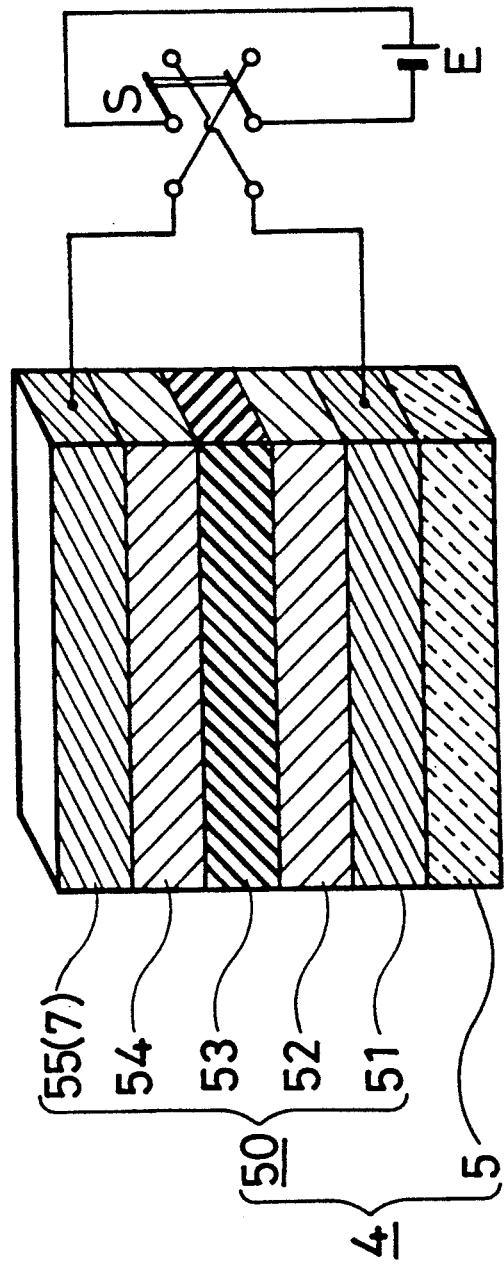
FIG. 9 is an illustrative view for showing a basic operation of the anti-halation mirror member applied in the vehicle mirror of the fourth preferred embodiment of the present invention.

FIG. 6 is a longitudinal section for showing the vehicle mirror of the fourth preferred embodiment and FIG. 7 is a partial enlarged section of FIG. 6. FIG. 8 is a substantial section for showing a configuration of the anti-halation mirror member 4 applied in the vehicle mirror of the fourth preferred embodiment of the present invention. FIG. 9 is an illustrative view for showing a basic operation of the anti-halation mirror member 4 applied in the vehicle mirror of the fourth preferred embodiment of the present invention.

As shown in FIGS. 6 and 7, the anti-halation mirror member 4 is comprised of the front transparent member 5 made of glass plate or transparent synthetic resin of the like exposed from the opening 2 of the holder 1; the rear mirror member 7 made of glass plate or transparent synthetic resin plate or metallic plate having a smaller area than that of the front transparent member 5; and an electrochromic element 50 placed between the rear mirror member 7 and the front transparent member 5 and acting as an anti-halation means constituting the rear mirror member 7 as the electrode. That is, the normal electrochromic element 50 is comprised of, as shown in FIGS. 8 and 9 a transparent electrode 51, a first color development layer 52, an insulation layer 53, a second color development 54 and a reflection electrode 55. It is necessary to provide a sealing member for maintaining the electrochromic element 50 against the front transparent member 5 in a sealed state at the reflection electrode 55. The reflection electrode 55 can be used as a transparent electrode and the like if it may not be operated as a mirror. However, in the preferred embodiment, the electrochromic element 50 is operated such that one electrode of the assembly of the electrochromic element 50 is applied as the reflection electrode 55 having functions to act as a sealing member for sealing it against the front transparent member 5 and the reflection film as a mirror. Accordingly, the reflection electrode 55 of the preferred embodiment has commonly the rear mirror member 7 acting as the reflection surface of the mirror and the aforesaid sealing member. The front transparent member 5 and the rear mirror member 7 are formed in a predetermined spaced-apart relation in a substantial parallel relation and in particular the rear mirror member 7 of the preferred embodiment is a reflection film formed by a metallic vapor deposited film and the like. As described in detail in reference to FIG. 4, the anti-halation mirror member 4 is constructed such that as a voltage is applied to the electrochromic element 50 acting as the anti-halation means through an electrical circuit, a colored state in the electrochromic element 50 is varied to enable a reflection rate of the rear mirror member 7 to be varied. In addition, in the fourth preferred embodiment, the circumferential edge of the front transparent member 5 of the anti-halation mirror member 4 and the circumferential edge of the supporting member 9 are held at the holding part 3 of the holder 1.

A configuration of the aforesaid anti-halation mirror member 4 will be described.

In FIGS. 8 and 9, in the present preferred embodiment, the electrochromic element 50 acting as the anti-halation means is formed between the front transparent member 5 composed of a glass plate exposed out of the opening 2 of the holder 1 and the rear mirror member 7 which can be an aluminum vapor deposited film capable of getting a high reflection as the mirror in particular. More accurately, the electrochromic element 50 is formed together with the rear mirror member 7. The electrochromic element 50 is made such that the front transparent member 5 composed of a glass plate is formed with a transparent electrode (ITO=indium oxide and tin oxide) 51, a first color development layer (IRTOF=iridium oxide and tin oxide) 52, an insulation layer ($Ta_2O_5$=tantalum pentaoxide), a second color development layer ($WO_3$=tungsten oxide) 54 and a reflecting electrode (Al =aluminum) 55 under a vapor depositing or spattering operation in sequence. The aforesaid reflecting electrode 55 of the preferred embodiment is in common with the rear mirror member 7 acting as a mirror reflecting surface.

However, in case of performing the preferred embodiment, it is also possible to provide a transparent electrode and further the sealing member for use in sealing the electrochromic element 50 against the front transparent member 5 can be formed by another member. As found in the reflecting electrode 55 of the preferred embodiment, if the electrode of the electrochromic element 50 is of resilient material having a superior reflecting characteristic, the electrode of the electrochromic element 50, the rear mirror member 7 acting as the mirror reflecting surface and the sealing member for sealing the electrochromic element 50 are applied in common, resulting in that a formation of a plurality of layers and layers corresponding to the plurality of layers can be saved.

The transparent electrode 51, the first color development layer 52, the insulation layer 53, the second color development layer 54 and the reflecting, electrode 55 (7) are composed of thin film layers secured to each other to constitute the electrochromic element 50. The anti-halation mirror member 4 of the present preferred embodiment is constituted by the electrochromic element 50 including the reflecting electrode 55 (7), and the front transparent member 5 composed of a glass plate.

As shown in FIG. 9, this type of anti-halation mirror member 4 is operated such that as a direction of the applied voltage of the power supply E of about ±1.35 (V) is changed over by changing over the changing-over switch S, the electrochromic element 50 develops a blue color under oxidization and reducing reaction of the first color development layer 52 and the second color development layer 54 and in turn if a reverse voltage is applied, the color is diminished. If this is applied to the anti-halation mirror member 4, development of a blue color causes a reflection of the mirror to be decreased and the deminishing of the color causes the reflection of the mirror to be increased.

That is, if the electrochromic element 50 of the anti-halation mirror member 4 is electrically energized, a color development of a light beam in the electrochromic element 50 is varied in response to its applied voltage and then a reflection factor of the rear mirror member 7 is varied. Accordingly, if an applied voltage for the electrochromic element 50 is properly adjusted, it is possible to dampen the reflection light from the anti-halation mirror member 4 caused by the head lamps, of the subsequent vehicle and to prevent the driver from being dazzled.

Then, the vehicle mirror of the fourth preferred embodiment of the present invention shown in FIG. 10 will be described for its configuration by referring to an entire diagram of the configuration of a control device for performing an electrical controlling operation.

Figure 10:
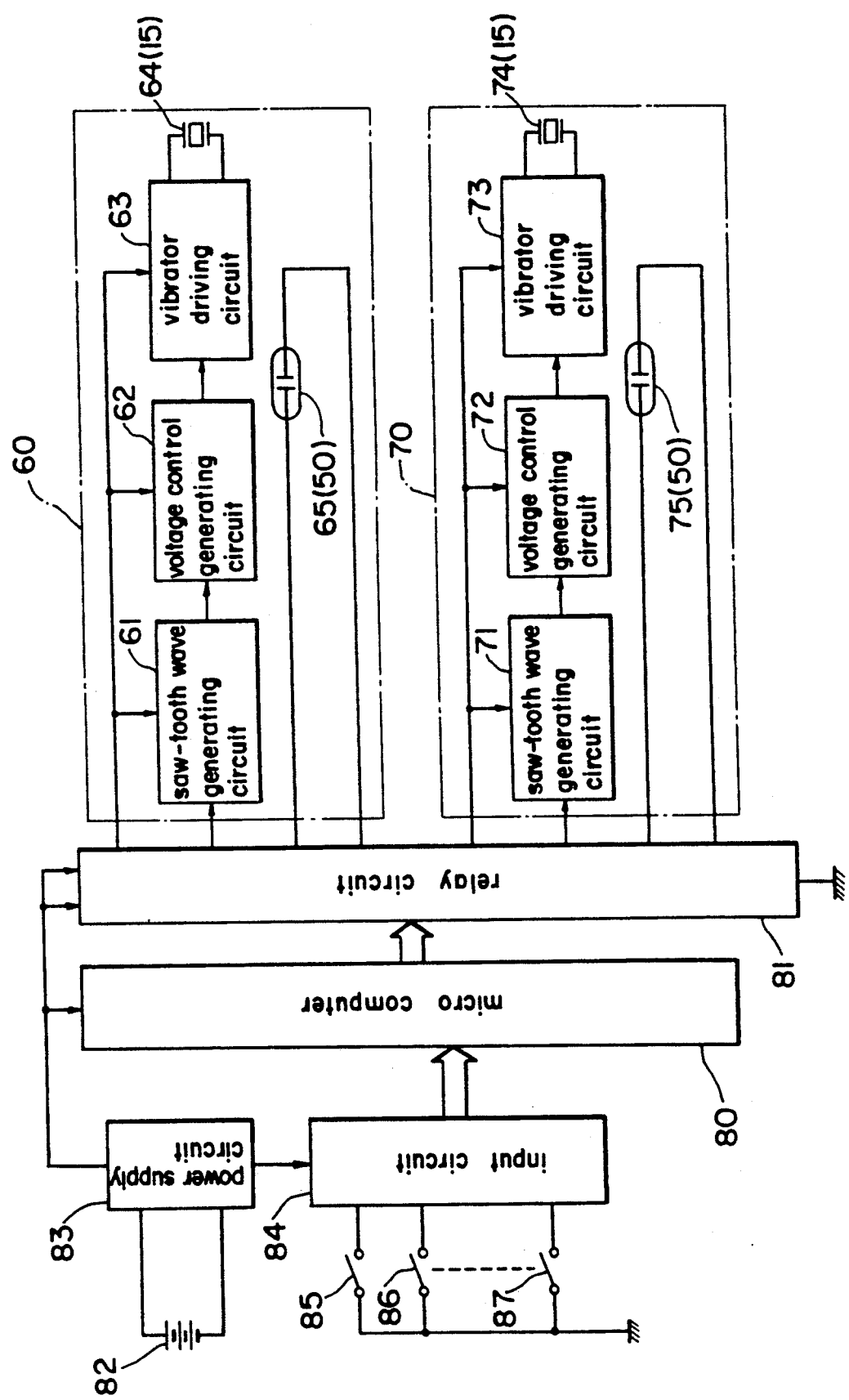
FIG. 10 is an entire configuration diagram for showing a control device for electrically controlling the vehicle mirror of the fourth preferred embodiment of the present invention.

In FIG. 10, a color development switch 85 is a switch for decreasing a mirror reflection factor of the electrochromic element 50 constituting the anti-halation mirror member 4. A color diminishing switch 86 is similarly a switch for use in increasing a mirror reflection factor of the electrochromic element 50. A vibration applying switch 87 is used for vibrating the piezo-electric vibrator 15 for a predetermined period of time at a frequency repeatedly varied between predetermined vibrating frequency ranges and this switch is operated when the water droplets and the frost are removed from the mirror. The piezo-electric vibrator 15 is vibrated at a frequency varied repeatedly between specified vibrating frequency ranges to cause an efficiency of removing the water droplets adhered to the front transparent member 5 to be improved. However, the removal of the water droplets or the like can be carried out by vibrating the front transparent member 5.

In this case, the aforesaid various switches are arranged at such locations as those where the driver in the vehicle compartment may easily operate them.

These color development switch 85, color diminishing switch 86 and vibration applying switch 87 are inputted to a micro-computer 80 through an input circuit 84. When they are "ON", "L" is inputted to the input circuit 84 and when "OFF", "H" is inputted. The micro-computer 80 is supplied with an electrical power from a power supply circuit 83 of which power is supplied from a vehicle batter 82. Output from the microcomputer 80 is supplied to a right driving circuit 60 and a left driving circuit 70 through a relay circuit 81.

An AC power of ultra-sonic frequency range to be supplied to the ultra-sonic vibrator 64 (the piezo-electric vibrator 15 in FIG. 6) of the right side view mirror is supplied from a vibrator driving circuit 63. An input of the vibrator driving circuit 63 is supplied from a voltage control generating circuit (V-F converter circuit) 62 and then an output frequency of the voltage control generating circuit 62 is determined in response to an output voltage of a saw-tooth wave generating circuit 61. The output voltage of the saw-tooth wave generating circuit 61 is controlled by a relay circuit 81 driven by the micro-computer 80. The anti-halation mirror 65 provided with the electrochromic element 50 may drive the relay circuit 81 in such a way as a mirror reflection factor is increased or decreased by the electrochromic element 50 when either the color development switch 85 or the color diminishing switch 86 is "ON".

These saw-tooth wave generating circuit 61, voltage control generating circuit 62, vibrator driving circuit 63 and ultra-sonic vibrator 64 may generate an ultra-sonic vibration required for removing water droplets adhered to the surface of the front transparent member 5 acting as a mirror surface of the right side view mirror. The anti-halation mirror 65 for varying a mirror reflection factor as required may constitute the right side view mirror driving circuit 60.

Similarly, an AC power of an ultra-sonic frequency range supplied to an ultra-sonic vibrator 74 for the left side view mirror (the piezo-electric vibrator 15 in FIG. 6) is supplied from the vibrator driving circuit 73. The input of the vibrator driving circuit 73 is supplied from the voltage control generating circuit 72. An output frequency of the voltage control generating circuit 72 is determined by an output voltage of the saw-tooth wave generating circuit 71. The output voltage of the saw-tooth wave generating circuit 71 is controlled by a relay circuit 81 driven by the microcomputer 80. The anti-halation mirror 75 provided with the electrochromic element 50 may drive the relay circuit 81 in such a way as the mirror reflection factor may be decreased or increased by the electrochromic element 50 when the color development switch 85 or the color diminishing switch 86 is "ON".

These saw-tooth wave generating circuit 71, voltage control generating circuit 72, vibrator driving circuit 73 and ultra-sonic vibrator 74 may generate an ultra-sonic vibration required for removing the water droplets adhered to the surface of the front transparent member 5 acting as the mirror surface of the left side view mirror. The anti-halation mirror 75 for varying the mirror reflection factor as required may constitute the left side view driving circuit 70.

The micro-computer 80 is driven by a switch input under a program control.

Figure 11:
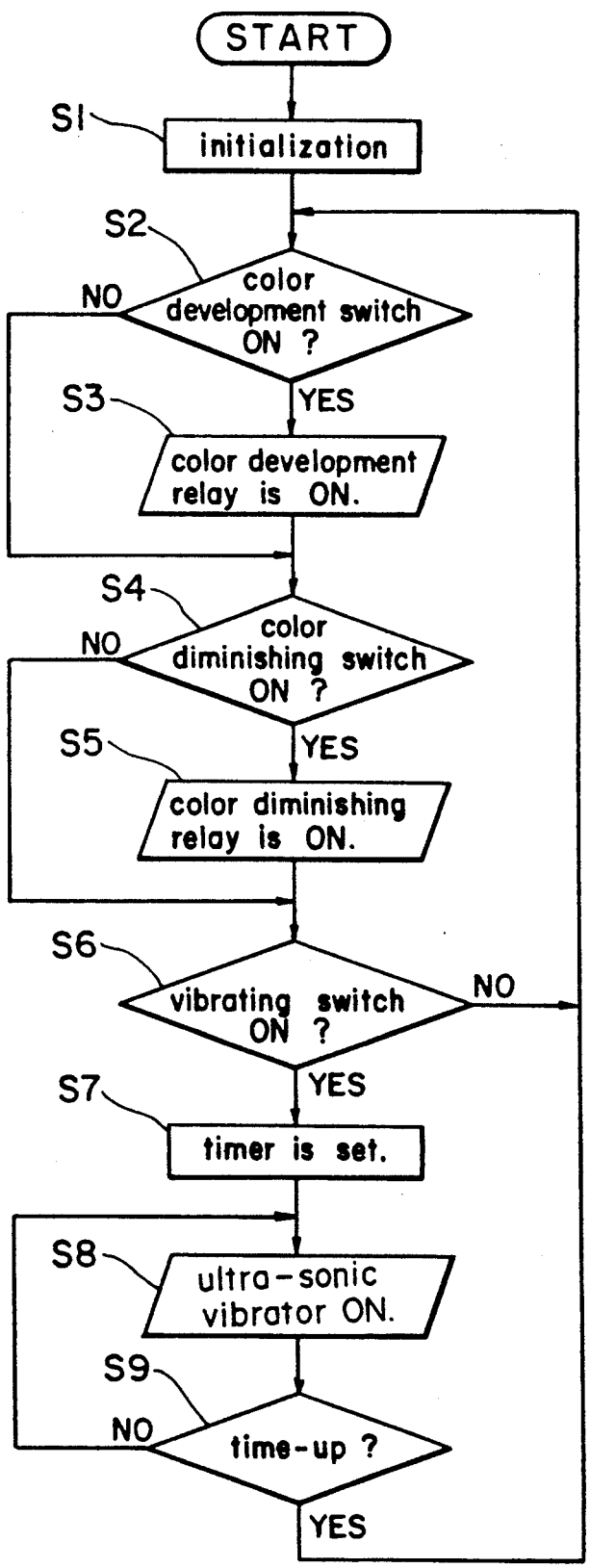
FIG. 11 is a flow chart for a controlling program for use in controlling the vehicle mirror of the fourth preferred embodiment of the present invention.

Within ROW of the micro-computer 55 is stored a control program for carrying out a control of the vehicle mirror of the present preferred embodiment and this is controlled as shown in FIG. 11.

FIG. 11 is a flow-chart for a control program for use in controlling the vehicle mirror of the first preferred embodiment of the present invention.

At first, this pro-gram may start its operation simultaneously with a turning "ON" of the ignition switch (not shown). At the step S1, an initialization is carried out, and a voltage applied to the electrochromic element 50 at the initialization state is set to a normal state which is similar to the state in which the color diminishing switch 86 is turned on in order to improve a visibility of the mirror while rising the mirror reflection factor so as to drive the relay circuit 81. At the step S2, it is discriminated whether the color development switch 85 is "ON" or not. If it it is "ON", the relay circuit 81 is operated in such a way as the mirror reflection factor of each of the anti-halation mirrors 65 and 75 is reduced to prevent dazzlement with the electrochromic element 50 at the step S3. At the step S4, it is discriminated whether the color diminishing switch 86 is "ON" or not, and if it is "ON", the relay circuit 81 is operated in such a way as the mirror reflection factor of each of the anti-halation mirrors 65 and 75 is increased with the electrochromic element 50 at the step S5 so as to improve its visibility.

When "ON" of the vibration applying switch 87 is discriminated at the step S6 and further when the vibration applying switch 87 is "ON", a time for driving the ultra-sonic vibrators 64, 74 (the piezo-electric vibrator 15) is set at the step S7. At the step S8, the ultra-sonic vibrators 64, 74 are "ON", i.e. an ultra-sonic frequency in a predetermined frequency range including a resonance frequency of each of the ultra-sonic vibrators 64 and 74 is repeatedly swept, this ultra-sonic frequency is applied to the ultra-sonic vibrators 64 and 74. At the step S9, a time for driving the ultra-sonic vibrators 64 and 74 is completed, and a processing of the routine returns to step S2.

In this way, the vehicle mirror of the fourth preferred embodiment of the present invention is comprised of the anti-halation mirror member 4 having the electrochromic element 50 set between the front transparent member 5 and the rear mirror member 7 having a little smaller area than that of the front transparent member; the supporting member 9 arranged at the rear mirror member 7 of the anti-halation mirror member 4 with a predetermined spacing 10 being left therebetween; the piezo-electric vibrator 15 fixed to the supporting member 9 while not being contacted with the rear mirror member 7; the spacer member 11 positioned between the circumferential edge of the front transparent member 5 and the circumferential edge of the supporting member 9 to transmit a vibration of the piezo-electric vibrator 15 to the front transparent member 5; and the holder 1 having the holding part 3 for holding the circumferential edge of the front transparent member 5 and the circumferential edge of the supporting member 9.

Thus, according to the vehicle mirror of the fourth preferred embodiment, since the piezo-electric vibrator 15 is fixed to the supporting member 11, there is no possibility that the vibration of the piezo-electric vibrator 15 is absorbed into the holder 1. In addition, the spacing 10 between the rear mirror member 7 and the supporting member 9 is kept by the spacer member 11 and the vibration of the piezo-electric vibrator 15 is transmitted to the front transparent member 5 through the spacer member 11, so that the vibration energy is not uselessly consumed within the electrochromic element 50, but a sufficient vibration for removing the water droplets is energized in the front transparent member 5. In particular, since the electrochromic element 50 acting as the anti-halation means constituting the anti-halation mirror member 4 is fully solid in form, a loss of vibrating energy is less. In addition, since a thickness of each of the layers is about 1000 to 7000 Å and the layers are entirely formed to have a film thickness of 2 ($\mu$m) or less, the front transparent member 5 and the electrochromic element 50 are integrally vibrated and then variations of the vibrating mode and the vibrating energy can be reduced as compared with a case in which a single front transparent member 5 is applied.

Since the piezo-electric vibrator 15 is fixed to the supporting member 9 and out of context with the rear mirror member 7, there is no possibility that a spacing between the front transparent member 5 and the rear mirror member 7 is varied in response to a temperature as the piezo-electric vibrator 15 is fixed. Thus it is possible to prevent a partial stress from being applied to the electrochromic element 50 to make a partial discoloration. Thus, the of anti-halation function performed made by the electrochromic element 50 is not diminished but an efficiency of removing water droplets by the piezo-electric vibrator 15 can be improved.

In particular, according to the experiment performed by the present inventors, a comparison between a case in which the electrochromic element 50 is applied as the anti-halation means and another case in which the liquid crystal is used in reference to the surface vibrating amplitude of the front transparent member 5 shows that the front transparent member 5 using the electrochromic element 50 shows a vibration amplitude of 3.0 ($\mu$m)

measured by a laser displacement meter when 25 (W) is inputted near a resonance frequency range (47 KHz) and the front transparent member 5 using the liquid crystal shows a vibration amplitude of 1.3 ($\mu$m). The vibrating energy at the surface of the front transparent member 5 is proportional with a square of the surface vibration speed, so that it is already confirmed that the front transparent member 5 using the electrochromic element 50 as the anti-halation means is advantageous more than 5 times as compared with the liquid crystal. That is, the electrochromic element 50 is used in the anti-halation mirror member 4 and liquid such as liquid crystal 8 is not required, so that a loss of vibration energy is less, an the vibration of the piezo-electric vibrator 15 can be efficiently transmitted to the front transparent member 5, resulting in that a high water droplets removing effect can be attained.

According to this fourth preferred embodiment, in particular, the spacer member 11 is placed between the circumferential edge of the front transparent member 5 and the circumferential edge of the supporting member 9, the vibration of the supporting member 9 is transmitted only through the spacer member 11 to the front transparent member 5 while keeping its high amplitude, resulting in that an attenuation of the vibrating energy during transmittance can be restricted and the vibration of the piezo-electric vibrator 15 can be efficiently transmitted to the front transparent member 5.

In addition, since the electrochromic element 50 constituting the anti-halation mirror member 4 is constructed such that the rear mirror member 7 capable of getting a reflection as a mirror is used as an electrode, so that a part of the electrochromic element 50 and another part of the mirror can be partially used together, this common use of the composing members enables a saving of work and material to be attained and a less-expensive cost can be attained.

Fifth Preferred Embodiment

Then, a fifth preferred embodiment of the present invention of the vehicle mirror will be described.

Figure 12:
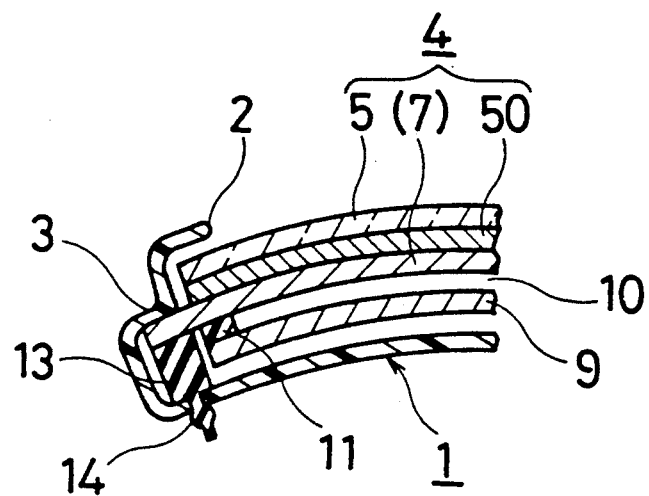
FIG. 12 is a partial section for showing the vehicle mirror of a fifth preferred embodiment of the present invention.

FIG. 12 is a partial enlarged section for showing a vehicle mirror of the fifth preferred embodiment of the present invention. In this figure, the same reference numerals as those of each of the preferred embodiments denote the same or corresponding portions as those of each of the preferred embodiments.

In case of the vehicle mirror of the fifth preferred embodiment, the anti-halation mirror member 4 is constructed such that the electrochromic element 50 vapor deposited or formed through sputtering is placed between the front transparent member 5 and the rear mirror member 7 slightly larger than an area of the front transparent member 5. The electrode opposite to the transparent electrode 51 of the aforesaid electrochromic element 50 and the rear mirror member 7 are in common to each other as disclosed in the first preferred embodiment. The mirror member 7 of the preferred embodiment is composed of a metallic plate in which the reflection layer made of chrominum is formed at the inner surface thereof by vapor depositing or sputtering operation. The supporting member 9 is formed substantially in the same size as that of the front transparent member 5 and arranged in the rear mirror member 7 with a predetermined spacing 10 being kept thereto. To the rear side of the supporting member 9 is fixed the piezo-electric vibrator 15 (not shown in FIG. 12) in such a way as it may not be contacted with the rear mirror member 7.

Accordingly, according to the vehicle mirror of the fifth preferred embodiment of the present invention, in particular, only the circumferential edge of the rear mirror member 7 is held at the holding part 3 of the holder 1 and thus the vibrating energy caused by the piezo-electric vibrator 15 is hardly transmitted to the holder 1 in addition to the similar actions and effects of the fourth preferred embodiment. In addition, since the front transparent member 5 has a free end at the opening 2 of the holder 1, there is no possibility that a contact pressure at the opening 2 of the holder 1 may badly influence the visibility of the anti-halation mirror member 4 differing from that of the fourth preferred embodiment. At the same time since the anti-halation mirror member 4 is integrally vibrated through vibration of the piezo-electric vibrator 15, there is no disadvantage that the vibration generated only at the front transparent member 5 interferes with the vibration transmitted to the rear mirror and attenuated. Accordingly, the vibration of the piezo-electric vibrator 15 can be efficiently transmitted to the front transparent member 5 and then a high water droplets removing effect can be attained.

Sixth Preferred Embodiment

Then, the sixth preferred embodiment of the vehicle mirror of the present invention will be described.

Figure 13:
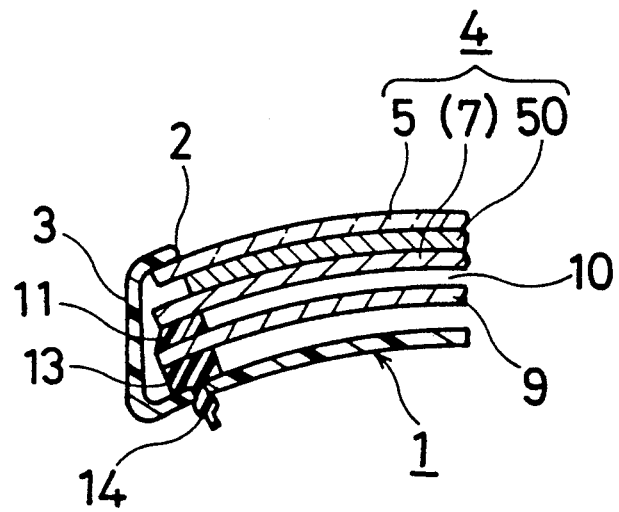
FIG. 13 is a partial section for showing a vehicle mirror of a sixth preferred embodiment of the present invention.

FIG. 13 is a partial enlarged section for showing the vehicle mirror of the sixth preferred embodiment. In this figure, the same reference numerals as those of each of the aforesaid preferred embodiments denote the same or corresponding elements of each of the preferred embodiments above. In this case, only the points differing from that of each of the preferred embodiments will be described.

In case of this vehicle mirror of the sixth preferred embodiment, each of the front transparent member 5, rear mirror member 7 and supporting member 9 is formed in a substantial same size. The spacer member 11 is placed between the circumferential edge of the rear mirror member 7 and the circumferential edge of the supporting member 9. The holding part 3 of the holder 1 helds the circumferential edge of the front transparent member 5, the circumferential edge of the rear mirror member 7 and the circumferential edge of the supporting member 9 at the same positions, respectively.

Accordingly, in accordance with the vehicle mirror of the sixth preferred embodiment, the front transparent member 5, rear mirror member 7 and supporting member 9 are fixed to each other at the substantial same circumferential positions and their fixing portions are held at the holding part 3 of the holder 1, resulting in that there is no possibility of applying a bad influence against a visibility of the anti-halation mirror member 4 in addition to the actions and effects similar to those of the aforesaid fourth preferred embodiment, and further the front transparent member 5 and the supporting member 9 are connected at the knot of vibration to enable a vibration of the piezo-electric vibrator 15 to be efficiently transmitted to the front transparent member 5 and then a high water droplets removing effect can be attained.

Seventh Preferred Embodiment

The seventh preferred embodiment of the vehicle mirror of the present invention will be described.

Figure 14:
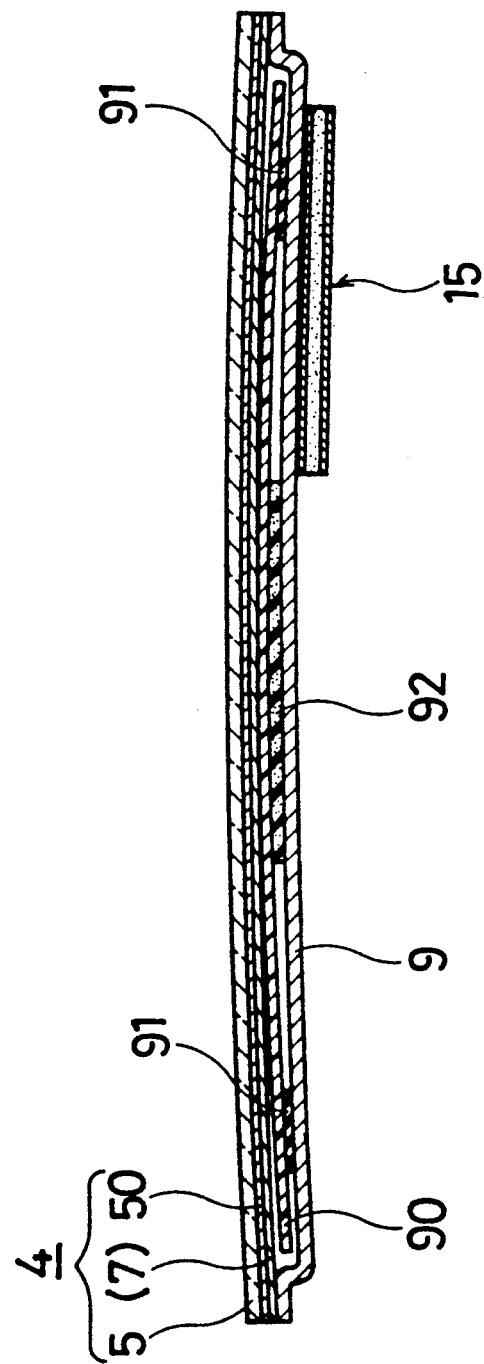
FIG. 14 is a section for showing a substantial part of a vehicle mirror of the seventh preferred embodiment of the present invention.
Figure 15:
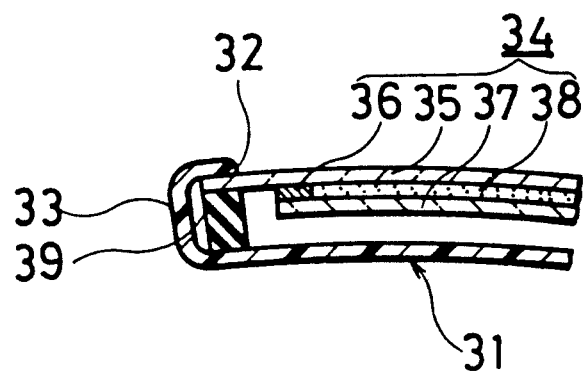
FIG. 15 is a partial section for showing a vehicle mirror having a function of anti-halation in the prior art.
Figure 16:
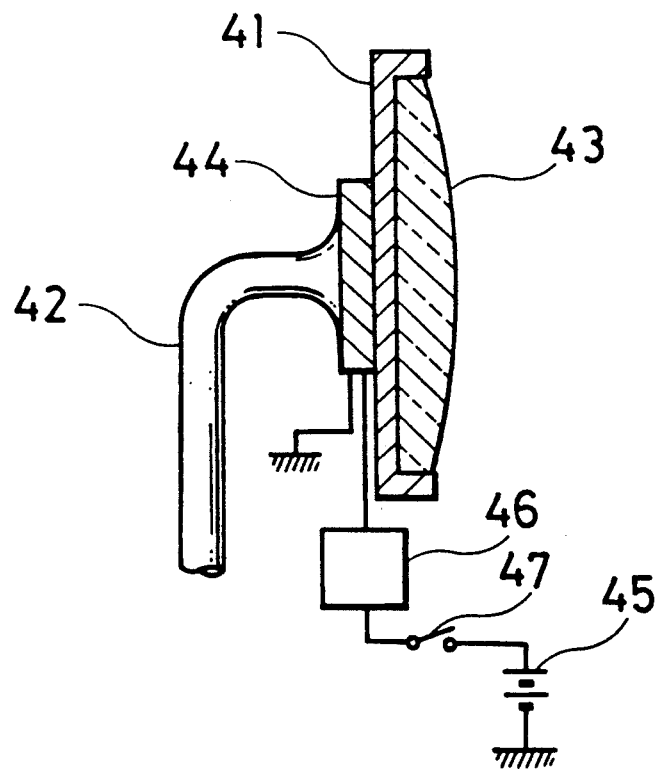
FIG. 16 is a section for showing a vehicle mirror having a function to remove water doplets in the prior art.
Figure 17:
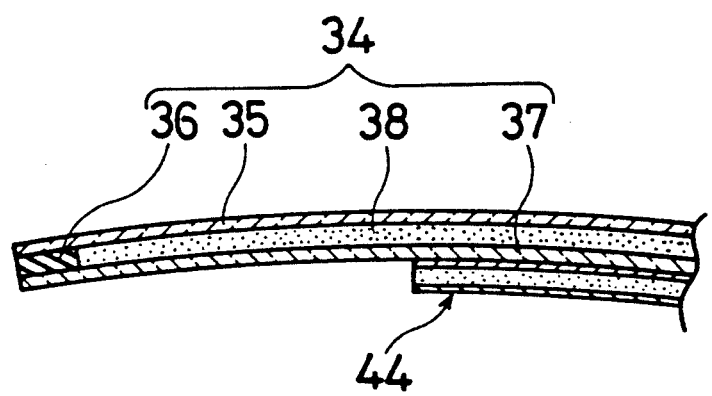
FIG. 17 is a partial section for showing a vehicle mirror having a function of an anti-halation.

FIG. 14 is a partial section for showing the vehicle mirror of the seventh preferred embodiment. In this figure, the same or corresponding portions of each of the aforesaid preferred embodiments denote the same or corresponding elements of each of the aforesaid preferred embodiments.

In this preferred embodiment, the transparent electrode 51, the first color development layer 52, the insulation layer 53, the second color development layer 54 and the reflection electrode 55 (7) are vapor deposited or sputtered in sequence to the entire inner surface of the front transparent member 5 and formed into thin film layers to constitute the electrochromic element 50. The anti-halation mirror member 4 of the preferred embodiment is constituted by the electrochromic element 50 including the reflection electrode 55(7), and the front transparent member 5 composed of a glass plate. The front transparent member 5 and the supporting member 9 are formed substantially into the same shape and both of them are rigidly connected by adhesive agent.

A heater 90 having a resistor printed on an insulating substrate of synthetic resin is used for removing frost or dark state of the mirror by heating the front transparent member 5. Four corners of the heater 90 are connected to the supporting member 9 by adhesive agent 91. The heater 90 is softly pushed against the surface of the rear mirror member 7 formed in the front transparent member 5 by a spacer 92 at its central part.

Accordingly, since the electrochromic element 50 is formed into a rigid metallic thin film layer by vapor deposting or sputtering, a rigid connection between the front transparent member 5 and the supporting member 9 can be performed and an entire surface of the front transparent member 5 can be efficiently used. In particular, in the case of the anti-halation mirror member 4, it is not necessary to provide a sealing peripheral member for sealing the liquid around the front transparent member 5 and thus the anti-halation feature can be applied to an entire area of the front transparent member, resulting in that a visibility of the mirror can be attained and a small-sized holder can be provided. The front transparent member 5 is heated by the heater 90 to enable the frost and dark state in the front transparent member 5 to be removed.

As described above, the vehicle mirror of each of the preferred embodiments of the present invention is provided with the front transparent member 5 and the rear mirror member 7 getting a reflection as a mirror; a holder 1 having an opening 2 for exposing the front trnasparent member 5 and the holding part 3 for holding more than one circumferential edges of at least the front transparent member 5, the rear mirror member 7 and the supporting member 9; and the piezo-electric vibrator 15 for vibrating the front transparent member 5, wherein the piezo-electric vibrator 15 is fixed to the supporting member 9 with a predetermined spacing 10 being left against the rear mirror member 7, the spacer member 11 is placed between the rear mirror member 7 and the supporting member 9 so as to hold the spacing 10 between the rear mirror member 7 and the supporting member 9 and at the same time the vibration of the piezo-electric vibrator 15 is transmitted to the front transparent member 5.

Accordingly, the vibration of the piezo-electric vibrator 15 can be efficiently transmitted to the front transparent member 5 through the supporting member 9 and the spacer member 11, a high water droplets removing effect can be realized and at the same time the piezo-electric vibrator 15 can be supported while not being contacted with the rear mirror member 7, so that it is possible to reduce a burden of the front transparent member 5 and the rear mirror member 7 to attain the vehicle mirror having a superior performance of function to remove water droplets.

As described above, the vehicle mirror of each of the preferred embodiments of the present invention is provided with the anti-halation mirror member 4 having an anti-halation means between the front transparent member 5 and the rear mirror member 7 capable of getting a reflection of a mirror; the holder 1 having the opening 2 for exposing the front transparent member 5 and the holding part 3 for holding the circumferential edge of the anti-halation mirror member 4; and the piezo-electric vibrator 15 for vibrating the front transparent member 5, wherein the supporting member 9 having the piezo-electric vibrator 15 fixed thereto with a predetermined spacing 10 being applied in respect to the rear mirror member 7 of the anti-halation mirror member 4, the spacer member 11 is arranged between the rear mirror member 7 and the supporting member 9, a spacing is held between the rear mirror member 7 and the supporting member 9 and at the same time the vibration of the piezo-electric vibrator 15 is transmitted to the front transparent member 5.

Accordingly, the present invention provides the vehicle mirror in which the vibration of the piezo-electric vibrator 15 can be efficiently transmitted to the front transparent member 5, a high water droplets removing effect can be realized, the piezo-electric vibrator 15 is supported while not being contacted with the rear mirror member 7, a stress is prevented from being applied only to a specified location of the anti-halation means comprised of the liquid crystal 8 or the electrochromic element 50 or the like, a discoloration is prevented, thereby a function to remove the water droplets and another function for providing an anti-halation are provided and a superior performance can be attained.

In this case, the piezo-electric element 15 of each of the preferred embodiments is retracted in a longitudinal direction under a lateral effect of the piezo-electric effects (an extending or retracting vibration in a radial direction from the center part of the piezo-electric element 17), its efficiency is improved and the front transparent member 5 is vibrated and the efficiency can be improved more than that of utilizing the longitudinal effect. Since the piezo-electric vibrator 15 has its electrode arranged in parallel with the front transparent member 5, an accommodation for the lateral effect may easily be performed and in addition, even if the mirror is made thin, both surfaces are protected by electrodes and there is less possibility of generating a breakage of the mirror.

As the anti-halation means of each of the preferred embodiments, the liquid crystal 8 and the solid electrochromic element 50 are utilized. However, in practicing the present invention, even if gel-like material is used as the electrochromic element 50, a relative high efficient transmittance of vibration can be attained and further liquid electrochromic element 50 is used, the practicing of the present invention can be attained. That is, as described in the aforesaid preferred embodiments, if the solid electrochromic element 50 is used, its manufacturing cost is less expensive and then as the anti-halation mirror member 4, a solid one can be attained. However, as the anti-halation means in practicing the present invention, a function for varying a transmittance or a function of colorization and a function capable of controlling directly a reflection factor of the liquid crystal 8 and the electrochromic element 50 or the like can be utilized.

In the above-described preferred embodiments, the front transparent member, the rear mirror member and the electrochromic element have been disclosed. However, in performing the present invention, it may not be limited to the configuration of each of the preferred embodiments, and for example, as the front transparent member, a glass plate or a transparent synthetic resin plate or the like can be applied and as the rear mirror member, aluminum or chrominum or the like can be applied and other well-known material can be used as these constituting materials.

In each of the aforesaid preferred embodiments, although the electrochromic element and the rear mirror member are formed by common members, in practicing the present invention, the sealing member for sealing the rear mirror member and the electrochromic element can be made of a separate member for independent or integral two functions for the electrodes constituting the electrochromic element. Similarly, the supporting member can be integrally formed with the rear mirror member.

In each of the aforesaid preferred embodiments of the present invention, the spacer member of thin adhesive agent or the like is placed between the rear mirror member and the supporting member, its clearance is held and at the same time, the vibration of the piezo-electric vibrator is transmitted to the front transparent member. In case of practicing the present invention, the circumference of the supporting member is bent to keep a spacing between them and means for mechanically holding them or adhering them together can be used, resulting in that there is no problem if the supporting member is connected to the front transparent member of the anti-halation mirror.

What is claimed is:
1. A vehicle mirror comprising:
    an anti-halation mirror member having an anti-halation means arranged between a front transparent member and a rear mirror member getting a reflection as a mirror;
    a supporting member arranged with a predetermined space being applied against the rear mirror member of said anti-halation mirror member;
    a piezo-electric vibrator fixed to said supporting member for generating vibration;
    a spacer member for holding said space between said rear mirror member and said supporting member for transmitting the vibration of said piezo-electric vibrator to said front transparent member; and
    a holder having an opening for exposing said front transparent member and a holding part for holding a circumferential edge of said anti-halation mirror member.

2. A vehicle mirror according to claim (1) in which the anti-halation means of said anti-halation mirror member is liquid crystal.

3. A vehicle mirror according to claim (1) in which the anti-halation means of said anti-halation mirror member is an electrochromic element.

4. A vehicle mirror according to claim (3) in which the electrochromic element constituting said anti-halation mirror member uses the rear mirror getting a reflection of mirror as an electrode.

5. A vehicle mirror according to claim (3) in which the electrochromic element constituting said anti-halation mirror member is made of solid material.

6. A vehicle mirror according to claim (4) in which the electrochromic element constituting said anti-halation mirror member is made of solid material.

7. A vehicle mirror according to claim (1) in which said piezo-electric vibrator has its vibrating direction directed from a center of said piezo-electric vibrator in a radial direction.

* * * * *